United States Patent
Tang et al.

(10) Patent No.: US 11,877,699 B2
(45) Date of Patent: Jan. 23, 2024

(54) FOOD PROCESSOR

(71) Applicant: KONINKLIJKE PHILIPS N.V., Eindhoven (NL)

(72) Inventors: Jiani Tang, Shanghai (CN); Jingwei Tan, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 813 days.

(21) Appl. No.: 16/976,095

(22) PCT Filed: Feb. 21, 2019

(86) PCT No.: PCT/EP2019/054255
§ 371 (c)(1),
(2) Date: Aug. 27, 2020

(87) PCT Pub. No.: WO2019/166306
PCT Pub. Date: Sep. 6, 2019

(65) Prior Publication Data
US 2020/0397188 A1    Dec. 24, 2020

(30) Foreign Application Priority Data

Mar. 2, 2018 (WO) ................. PCT/CN2018/077902
May 11, 2018 (EP) ..................................... 18171908

(51) Int. Cl.
*A47J 43/07* (2006.01)
*A47J 43/042* (2006.01)
*A47J 43/046* (2006.01)

(52) U.S. Cl.
CPC ......... *A47J 43/0716* (2013.01); *A47J 43/042* (2013.01); *A47J 43/046* (2013.01)

(58) Field of Classification Search
None
See application file for complete search history.

(56) References Cited

U.S. PATENT DOCUMENTS

2008/0292765 A1    11/2008  Prahash
2010/0125418 A1*    5/2010  Hyde ..................... G01G 19/56
                                                              702/19

(Continued)

FOREIGN PATENT DOCUMENTS

CN    1505481 A    6/2004
CN    101048096 A   10/2007

(Continued)

OTHER PUBLICATIONS

International Search Report and Written Opinion dated Apr. 23, 2019 for International Application No. PCT/EP2019/054255 Filed Feb. 21, 2019.

(Continued)

*Primary Examiner* — John J Norton
(74) *Attorney, Agent, or Firm* — Maschoff Brennan (57) ABSTRACT

The present invention relates to a food processor (10). It is described to hold (110) a first food product in a food chamber, wherein food processing means are configured to process at least the first food product in the food chamber. An ingredient identification module determines (120) if either sucrose or fructose is the dominant sugar in the first food product to be processed. A processing unit determines (130) a processing protocol for processing the first food product, wherein determination of the processing protocol (Continued)

comprises utilization of the determined dominant sugar in the first food product. The food processing means processes (140) at least the first food product in the food chamber.

15 Claims, 2 Drawing Sheets

(56) References Cited

U.S. PATENT DOCUMENTS

| | | | |
|---|---|---|---|
| 2016/0067866 A1* | 3/2016 | Sekar | A47J 44/00 99/348 |
| 2016/0241653 A1 | 8/2016 | Ciepiel | |
| 2020/0093327 A1* | 3/2020 | Hua | A23L 5/10 |

FOREIGN PATENT DOCUMENTS

| | | | |
|---|---|---|---|
| CN | 102164575 A | 8/2011 | |
| CN | 107621789 A | 1/2018 | |
| KR | 1797875 B1 * | 11/2017 | A47J 43/0716 |
| RU | 2188570 C2 | 9/2002 | |
| RU | 2218856 C1 | 12/2003 | |
| RU | 2532147 C2 | 10/2014 | |
| WO | 2012/073171 | 6/2012 | |
| WO | 2015/138961 | 9/2015 | |
| WO | 2016051190 | 4/2016 | |
| WO | 2016133894 A1 | 8/2016 | |

OTHER PUBLICATIONS

Birch: "Modulation of sweet taste", BioFactors 9 (1999) 73-80.
Delwiche: "The impact of perceptual interactions on perceived flavor", Food Quality and Preference 15(2004) 137-146.
Greene, et al: "Temperature Affects Human Sweet Taste via At Least Two Mechanisms", Chemical Senses, 2015, 391-399.
Mahmood, et al: "Compositional Variation in Sugars and Organic Acids at Different Maturity Stages in Selected Small Fruits from Pakistan", Int. J. Mol. Sci. 2012, 13, 1380-1392.
Osberger, et al: "Pure Fructose and Its Applications in Reduced-Calorie Foods" Description, Chapter 6, in "Low Calorie and Specialty Dietary Foods", by B.K. Dwivedi.
Spilane: "Optimising Sweet Taste in Foods", Abstract, 2006, CRC Press.

* cited by examiner

Fig. 4

FOOD PROCESSOR

CROSS REFERENCE TO RELATED APPLICATIONS

This application is the U.S. National Phase application under 35 U.S.C. § 371 of International Application No. PCT/EP2019/054255 filed Feb. 21, 2019, which claims the benefit of European Patent Application Number 18171908.9 filed May 11, 2018 and Patent Application Number PCT/CN2018/077902 filed Mar. 2, 2018. These applications are hereby incorporated by reference herein.

FIELD OF THE INVENTION

The present invention relates to a food processor, to a method for processing food, as well as to a computer program element.

BACKGROUND OF THE INVENTION

The general background of this invention is the field of the making or processing of juices, smoothies and mixtures containing one or more fruits, vegetables, herbs in various combinations. Over consumption of sugar is an issue that is a challenge to the worldwide population. Consumers are generally aware that consuming too much sugar is not good for their health. However, we human beings do generally inherently love food with a sweet taste. In the food and beverage industry, manufacturers are replacing traditional added sugar (e.g., sucrose, glucose, fructose, etc) with new sweeteners that are low-calorie (e.g., stevia, erythritol, etc.). However, there may not be health benefits associated with such additions. With respect to the making of juices, smoothies and mixtures current blenders or juicers simply allow consumers to put any food into it and blend to make smoothie or juice or mixture. If the consumer considers that the food product it not sweet enough, the consumer might add sugar, honey or a more sugar-rich fruits/vegetables to be blended with the start ingredients to meet their requirements. However, this increases the risk of the increased intake of sugar, whilst at the same time nutritionists recommend that sugar intake should be reduced to avoid some diseases, and health issues such as obesity.

SUMMARY OF THE INVENTION

It would be advantageous to have improved food processor and method for processing food.

The object of the present invention is solved with the subject matter of the independent claims, wherein further embodiments are incorporated in the dependent claims. It should be noted that the following described aspects and examples of the invention apply also for the food processor, the method for food processing and for the computer program element and the computer readable medium.

According to a first aspect, there is provided a food processor, comprising:
 a food chamber;
 food processing means;
 an ingredient identification module; and
 a processing unit.

The food chamber is configured to hold foods. The food processing means is configured to process the foods held in the food chamber. The ingredient identification module is configured to determine if either sucrose or fructose is the dominant sugar in a first food product to be processed in the food chamber. The processing unit is configured to determine a processing protocol for processing at least the first food product. Determination of the processing protocol comprises utilization of the determined dominant sugar in the first food product.

It is to be noted that a first food product here means one or more items of fruit and/or vegetables. Thus, an amount of one type of fruit or an amount of a single type of vegetable, or a mixture of two or more types of fruit, or a mixture of two or more vegetables, or a mixture of a fruit type with one or more vegetables, or a mixture of a vegetable with one or more fruit types is what can be the first food product. The first food product can then be processed on the basis of whether the predominant sugar in that first food product is sucrose or fructose, enabling a healthy and tasty end product to be produced that does not contain too much sugar, but still meets the taste requirements of consumers. This can be via the addition of water or other fluids to the first food product, the addition of one or more fruits to the first food product, the addition of one or more vegetables to the first fruit product, the addition of a fruit type and one or more vegetable types, the addition of a vegetable type and one or more fruit types, a processing temperature for serving the end product, and all specifically based on whether the predominant sugar was sucrose or fructose in the original first food product.

In other words, a blender, mixer, or juicer processes a food product based upon whether fructose or sucrose is the dominant sugar in the food product. In has been found that different additional foods and/or fluids and/or salty solutions can be added to food products and/or the food product processed at particular temperatures to provide processed foods with a healthy amount of sugar, and wherein what is added or the temperature of processing can depend upon the dominant sugar to be found in the food product. To put this another way, foods can be paired to provide a healthy juice or smoothie or mixture that does not sacrifice the taste perception.

Thus, for example rather than a user having to add sugar, honey or sugar-rich fruit/vegetables to a food product to be blended in order to improve the taste, the food processor automatically determines how that food product is to be processed based on the dominant sugar in that food product. This enables, for example the selection of optimum fruit and vegetable pairings to be processed with the food product to provide the required taste, without having to resort to additional sugar rich products.

To put this another way, a juicer or blender or smoothie maker can enhance the sweetness sensory perception based on the detection of the dominant sugar composition of ingredients. This can be via the food processor diluting or reducing the sugar concentration (fruit and vegetables with sugar) of juice/smoothies with a controlled just right liquid (amount and temperature) and/or other proper paring of food.

In this manner, by knowing the predominant sugar in a starting set of ingredients, the processing of those start ingredients can be tailored to that determined predominant sugar such that a consumer's taste perception of a juice, or smoothie or mixture is enhanced without having to resort to the addition of additional sweetening agents such as sugar, honey etc. This then provides a finished product that satisfies the taste requirements and at the same time has increased nutritional and health properties and is less calorific.

In an example, determination of the processing protocol comprises the determination of a second food product to be added to the first food product in the food chamber, and wherein processing of at least the first food product comprises processing the first food product and the second food product.

It is to be noted that a second food product here means one or more items of fruit and/or vegetables. Thus, an amount of one type of fruit or an amount of a single type of vegetable, or a mixture of two or more types of fruit, or a mixture of two or more vegetables, or a mixture of a fruit type with one or more vegetables, or a mixture of a vegetable with one or more fruit types is what can be the second food product.

In this manner, a food product can be processed with selected and pairing further other foods (fruit or vegetables), avoiding those that would reduce the sweet sensory perception based on the dominant sugar composition attribute and/or increase those that would enhance the sweetness sensory perception.

In an example, determination of the processing protocol comprises the determination of an amount of fluid to be added to the first food product in the food chamber, and wherein processing of at least the first food product comprises processing the first food product and the determined amount of fluid.

In an example, determination of the processing protocol comprises the determination of an amount of salt to be added to the first food product in the food chamber, and wherein processing of at least the first food product comprises processing the first food product and the determined amount of salt.

In other words, a salt solution can be automatically dispensed and a required amount of salt solution, which can have its temperature controlled, is added to and mixed with the juice/smoothie. This will further enhance the sweetness sensory perception.

In an example, the food chamber comprises heating means and/or cooling means, and wherein determination of the processing protocol comprises the determination of a temperature for processing the first food product. Processing of at least the first food product comprises processing the first food product at the determined temperature.

In this manner, the sweetness perception can be enhanced by temperature control of the served smoothie/juice/blend/mixture.

In an example, the ingredient identification module comprises at least one sensor configured to provide sensing data for the first food product, and wherein determination of the dominant sugar in the first food product comprises utilization of at least some of the sensing data.

In an example, the at least one sensor comprises a colour sensor configured to determine at least one colour of the first food product, and wherein the sensing data comprises the at least one colour of the first food product.

Thus, the colour of the food product and/or of its pulp when it has been partially processed can be used to identify the food product. For example, a green colour of a food product pulp could be used to indicate that the food product is an apple or grape or a mixture of fruits and/or vegetables that after an initial processing stage yields a pulp that is green or tending toward being green, for which fructose is the dominant sugar. For example, a yellow pulp colour can be used to indicate that the food product is an apricot, orange, pineapple, peach, banana, carrot or papaya for example, for which the dominant sugar is sucrose, or a mixture of fruits and/or vegetables that after an initial processing stage yields a pulp that is yellow or tending toward being yellow. For example, a red colour of a food product pulp could be used to indicate that the food product is a red-watermelon, strawberry or cherry or a mixture of fruits and/or vegetables that after an initial processing stage yields a pulp that is red or tending toward being red, for which fructose is the dominant sugar. Then, the food product can be processed accordingly for example through addition of the optimum pairing fruit and/or vegetables and/or fluids and/or processing temperatures.

In an example, the at least one sensor comprises a sweetness sensor configured to determine a sweetness level of the first food product, and wherein the sensing data comprises the sweetness level.

In this way, the dominant sugar can be directly determined.

In an example, the sweetness sensor comprises blending and/or grounding means and comprises heating and/or cooling means. Determination of the sweetness level comprises the blending and/or grinding of an amount of the first food product followed by heating and/or cooling.

In other words, a small-amount of food is blended or ground to make a sample juice/smoothie. A sweetness sensor detects its sweet level. Then this sample is heated up or cooled down about 5~12° C. The sweetness sensor again detects its sweet level again. If it has become less sweet, then it is marked as a sucrose-dominant food with a certain confidence level. Otherwise, it will be marked as fructose-dominant food with a certain confidence level. The confidence level relates to the amount of change in sweetness. The determination of the dominant sugar as determined using the sweetness sensor can be augmented if necessary by other dominant sugar determination means.

In an example, the ingredient identification module comprises at least one input unit configured to provide product data for the first food product, and wherein determination of the dominant sugar in the first food product comprises utilization of at least some of the product data.

In an example, the at least one input unit is configured to enable a user to input data relating to the first food product.

In this way a user can directly input, via a key pad on the food processor or via a key pad of a mobile phone what fruit(s) and/or vegetable(s) is to be processed as the first food product, and the processing unit determines from this information what the predominant sugar is for these start ingredients and determines how they should be processed on the basis of the determined predominant sugar in order to provide a final product that is healthy yet satisfies taste requirements.

In an example, the at least one input unit comprises means to input bar-code information relating to the first food product.

In an example, the food chamber comprises weighing means configured to determine a weight of foods in the food chamber, and wherein determination of the processing protocol comprises utilization of the determined weight of the first food product.

According to a second aspect, there is provided a method for processing food, comprising:
a) holding a first food product in a food chamber, wherein food processing means are configured to process at least the first food product in the food chamber;
b) determining by an ingredient identification module if either sucrose or fructose is the dominant sugar in the first food product to be processed;
c) determining by a processing unit a processing protocol for processing the first food product, wherein determination of the processing protocol comprises utilization of the determined dominant sugar in the first food product; and
d) processing by the food processing means at least the first food product in the food chamber.

According to another aspect, there is provided a computer program element controlling the food processor as previously described which, when the computer program element is executed by a processing unit, is adapted to perform the method steps as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF THE EMBODIMENTS

Figure 1:
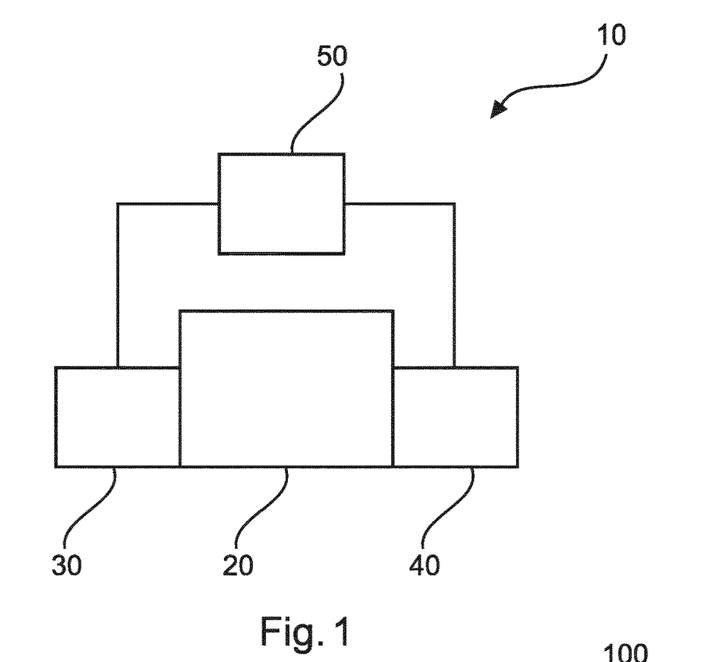
FIG. 1 shows a schematic set up of an example of a food processor.

FIG. 1 shows an example of a food processor 10. The food processor 10 comprises a food chamber 20, food processing means 30, an ingredient identification module 40 and a processing unit 50. The food chamber 20 is configured to hold foods. The food processing means 30 is configured to process the foods held in the food chamber 20. The ingredient identification module 40 is configured to determine if either sucrose or fructose is the dominant sugar in a first food product to be processed in the food chamber 20. The processing unit 30 is configured to determine a processing protocol for processing at least the first food product. Determination of the processing protocol comprises utilization of the determined dominant sugar in the first food product.

In an example, the ingredient identification module identifies food: by a sensor (e.g.: image or e-nose, e-tongue), or by bar-code label reading, or by a consumers manual input. Then, it can access a pre-stored "Sweet taste key contributor" table in storage in the processor or in the Cloud sever to get the sweet taste key contributor of this food, with an example of part of such a table shown below. (It could also be linked to the Internet, which provides the food ingredients composition to get the sugar composition of this food). This will mark this fruit/vegetable as sucrose-dominant or fructose-dominant.

TABLE 1

Table of food (fruit and vegetables) key sweet taste contributor

| Colour of pulp | Food name | Sweet Key Contributor |
|---|---|---|
| yellow | Apricot | sucrose |
| yellow | orange | sucrose |
| yellow | pineapple | sucrose |
| yellow | peach | sucrose |
| yellow | banana | sucrose |
| yellow | papaya | sucrose |
| red | Watermelon-red | fructose |
| red | strawberry | fructose |
| red | cherry | fructose |

TABLE 1-continued

Table of food (fruit and vegetables) key sweet taste contributor

| Colour of pulp | Food name | Sweet Key Contributor |
|---|---|---|
| green | apple | fructose |
| green | grape | fructose |

In an example, when sucrose is determined to be the dominant sugar, it can be determined that no further food product needs to be paired with the food product being processed. However, further food products can be processed along with the food product if required.

In an example, when fructose is determined to be the dominant sugar, it can be determined that further food products should be paired with the food product being processed.

In an example, the food processing means comprises a blending blade and/or juice extractor and/or smoothie extractor.

According to an example, determination of the processing protocol comprises the determination of a second food product to be added to the first food product in the food chamber. The processing of at least the first food product can then comprise processing the first food product and the second food product.

In an example, when sucrose is determined to be the dominant sugar, the second food product comprises a food with a lower sugar content. In an example, when sucrose is determined to be the dominant sugar, the second food product should not comprise a food containing acids (especially citric acid).

In an example, when fructose is determined to be the dominant sugar, the second food product comprises a food containing acids (organic acids, citric acid, ascorbic acid etc). In this way, a pH of the liquid can be lowered, which can result in the sweetness of a fructose rich blend being enhanced. A good source of organic acids can include: citrus fruits (lemon, lime etc); berries (strawberries, blackberry, elderberry etc). A good source of ascorbic acid can include: Kiwifruit, orange, lemon, papaya, pepper, parsley, kale, broccoli etc.

According to an example, determination of the processing protocol comprises the determination of an amount of fluid to be added to the first food product in the food chamber. Processing of at least the first food product can then comprise processing the first food product and the determined amount of fluid.

Thus, for example a processed smoothie/juice can be diluted with a certain amount of water or salt water, to reach similar sweet taste perception, while it contains a relatively lower sugar concentration.

In an example, the fluid is water.

In an example, the fluid is a salt solution.

According to an example, determination of the processing protocol comprises the determination of an amount of salt to be added to the first food product in the food chamber. Processing of at least the first food product can then comprise processing the first food product and the determined amount of salt.

According to an example, the food chamber comprises heating means and/or cooling means. Determination of the processing protocol can then comprise the determination of a temperature for processing the first food product. Processing of at least the first food product can then comprise processing the first food product at the determined temperature.

In an example, if the dominant sugar is determined to be sucrose the food product is heated up. In an example, the food product is heated up by 2C. In an example, the food product is heated up by 5C. In an example, the food product is heated up by 7.5 C. In an example, the food product is heated up by 10C.

In an example, if the dominant sugar is determined to be fructose the food product is cooled down. In an example, the food product is cooled down by 2C. In an example, the food product is cooled down by 5C. In an example, the food product is cooled down by 7.5 C. In an example, the food product is cooled down by 10C.

According to an example, the ingredient identification module comprises at least one sensor configured to provide sensing data for the first food product. Determination of the dominant sugar in the first food product can then comprise utilization of at least some of the sensing data.

According to an example, the at least one sensor comprises a colour sensor configured to determine at least one colour of the first food product. The sensing data can comprise the at least one colour of the first food product.

In an example, the colour sensor detect a fruit's colour, especially with respect to identifying its yellowish extent. If the yellowish level is lower than a pre-stored value, it will be marked as fructose-dominant. Otherwise, it will be marked as sucrose-dominant.

According to an example, the at least one sensor comprises a sweetness sensor configured to determine a sweetness level of the first food product. The sensing data can comprise the sweetness level.

According to an example, the sweetness sensor comprises blending and/or grounding means and comprises heating and/or cooling means. Determination of the sweetness level can comprise the blending and/or grinding of an amount of the first food product followed by heating and/or cooling.

According to an example, the ingredient identification module comprises at least one input unit configured to provide product data for the first food product. Determination of the dominant sugar in the first food product can comprise utilization of at least some of the product data.

According to an example, the at least one input unit is configured to enable a user to input data relating to the first food product.

According to an example, the at least one input unit comprises means to input bar-code information relating to the first food product.

Thus, for example, a user can use a mobile phone with a bar code scanner to scan the bar codes on one or more fruit and vegetables that are to be processed by the food processor. This data is downloaded to the food processor, which then determines what the predominant sugar is for the specific food product to be processed, and determines how that food product is to be processed on the basis of the determined predominant sugar. In an example, the food processor itself has a bar code scanner that can directly scan produce to determine exactly what fruit(s) and/or vegetable(s) is to be processed, from which the predominant sugar can be determined through for example reference to tabled information held within the food processor itself or accessed via the Cloud or through the internet. The processing unit of the food processor then determines how the food product is to be processed.

According to an example, the food chamber comprises weighing means configured to determine a weight of foods in the food chamber. Determination of the processing protocol can comprise utilization of the determined weight of the first food product.

Thus for example, a sugar concentration in a processed smoothie/juice can be calculated according to food composition database determined on the basis of information provided by an ingredient identification module but also based on the weight of each food ingredient.

Figure 2:
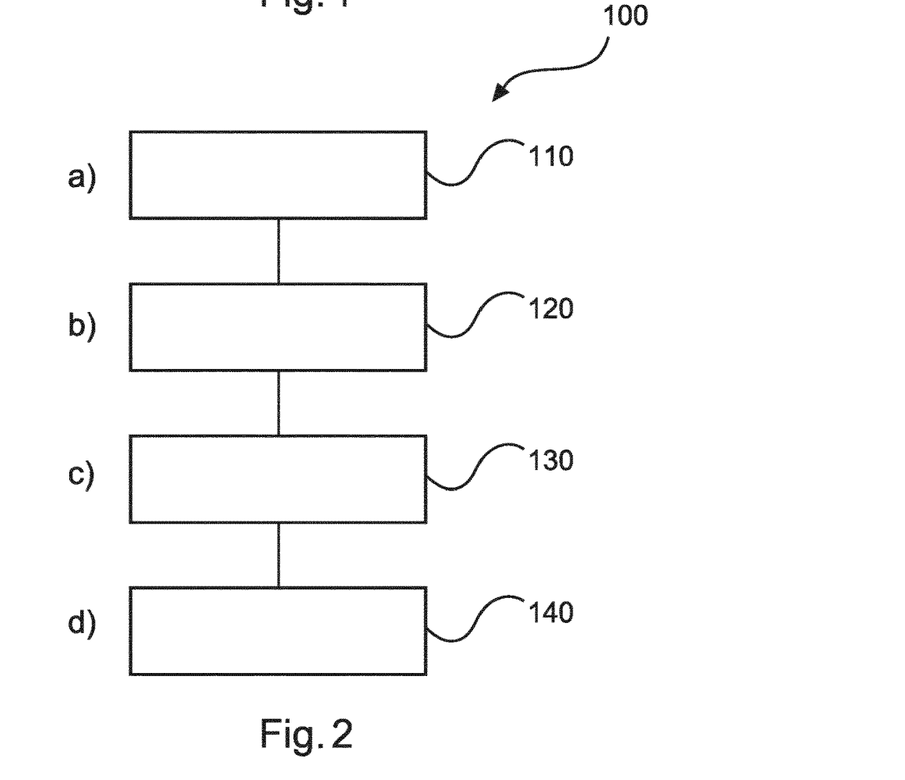
FIG. 2 shows a method for processing food.

FIG. 2 shows a method 100 for processing food in its basic steps. The method 100 comprises:

in a holding step 110, also referred to as step a), holding a first food product in a food chamber, wherein food processing means are configured to process at least the first food product in the food chamber;

in a determining step 120, also referred to as step b), determining by an ingredient identification module if either sucrose or fructose is the dominant sugar in the first food product to be processed;

in a determining step 130, also referred to as step c), determining by a processing unit a processing protocol for processing the first food product. Determination of the processing protocol comprises utilization of the determined dominant sugar in the first food product; and in a processing step 140, also referred to as step d), processing by the food processing means at least the first food product in the food chamber.

In an example, the food processing means comprises a blending blade and/or juice extractor and/or smoothie extractor.

In an example, step c) comprises determining a second food product to be added to the first food product in the food chamber, and wherein step d) comprises processing the first food product and the second food product.

In an example, step c) comprises determining an amount of fluid to be added to the first food product in the food chamber, and wherein step d) comprises processing the first food product and the determined amount of fluid.

In an example, step c) comprises determining an amount of salt to be added to the first food product in the food chamber, and wherein step d) comprises processing the first food product and the determined amount of salt.

In an example, the food chamber comprises heating means and/or cooling means, and wherein step c) comprises determining a temperature for processing the first food product, and wherein step d) comprises processing the first food product at the determined temperature.

In an example, the ingredient identification module comprises at least one sensor configured to provide sensing data for the first food product, and wherein step b) comprises utilizing at least some of the sensing data.

In an example, the at least one sensor comprises a colour sensor configured to determine at least one colour of the first food product, and wherein the sensing data comprises the at least one colour of the first food product.

In an example, the at least one sensor comprises a sweetness sensor configured to determine a sweetness level of the first food product, and wherein the sensing data comprises the sweetness level.

In an example, the sweetness sensor comprises blending and/or grounding means and comprises heating and/or cooling means, and wherein determination of the sweetness level comprises the blending and/or grinding of an amount of the first food product followed by heating and/or cooling.

In an example, the ingredient identification module comprises at least one input unit configured to provide product data for the first food product, and wherein step b) comprises utilizing of at least some of the product data.

In an example, the at least one input unit is configured to enable a user to input data relating to the first food product.

In an example, the at least one input unit comprises means to input bar-code information relating to the first food product.

In an example, the food chamber comprises weighing means configured to determine a weight of foods in the food chamber, and wherein step c) comprises utilizing the determined weight of the first food product.

Figure 3:
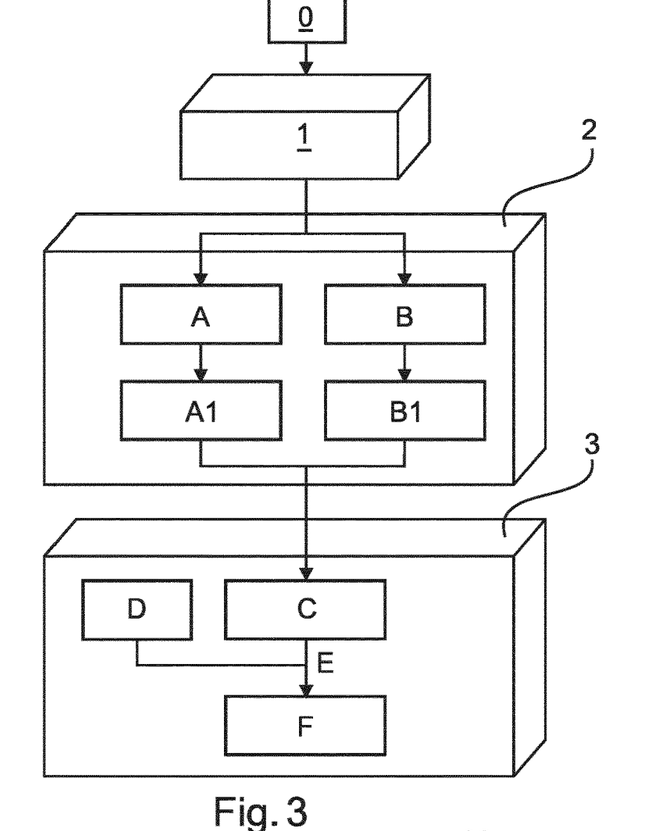
FIG. 3 shows a detailed workflow for processing food.
Figure 4:
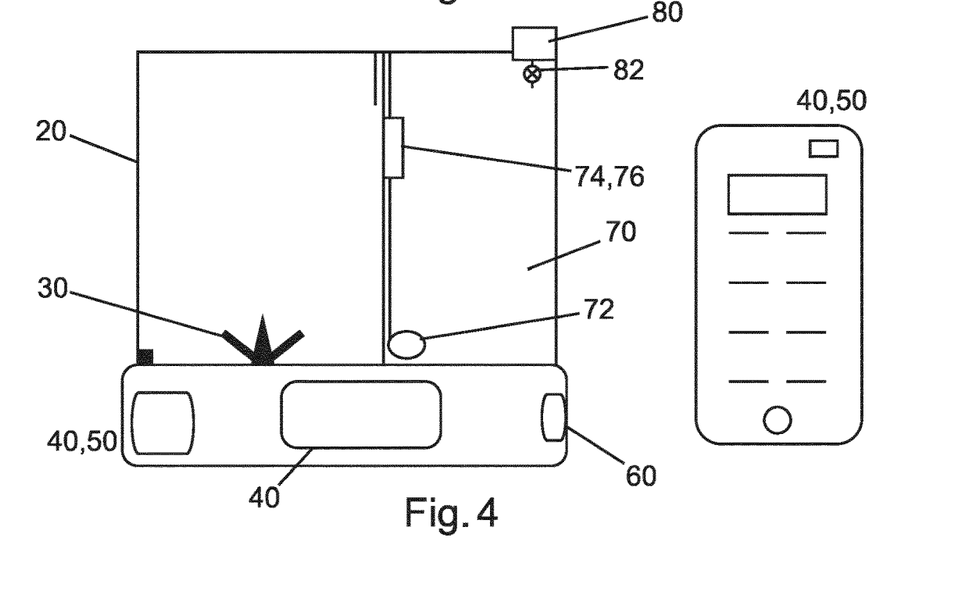
FIG. 4 shows a detailed schematic example of a food processor.

The food processor and method for processing food are now described in more detail with respect to FIGS. 3-4.

Acids and salts can influence the sweet taste perception of sweeteners. An acid taste can suppress the sweetness delivery of a sweet substance. Studies have shown that mixtures of sucrose and citric acid can suppress taste intensities. However, the influence of acidity on the sweetness of fructose is a special case complicated by the fact that fructose in solution is present as a mixture of anomeric forms: β-pyranose, β-furanose and its keto-hexose form. Of these anomeric conformations, only the β-pyranose anomer is believed to be sweet. Thus, as the pH of a solution of fructose is reduced, the equilibrium of fructose anomers is shifted in favour of the sweet β-pyranose form, thus resulting in sweetness being enhanced (Osberger and Linn, 1978 "Pure fructose and its applications in reduced calorie foods", in Dwivedi, B. K., Low Calorie and Special Dietary Foods, West Palm Beach: CRC Press, 115-123). It is for this reason that the sweetness of a fructose solution is at a maximum at cold temperatures and low pH.

Furthermore, studies suggest that some salts at specific use-levels can cause enhancement of sweet taste, with potassium acetate, potassium chloride and sodium chloride all claimed to enhance sweetness at specific concentrations (Table 2; Birch, (1999) BIRCH, G. G. (1999) 'Modulation of sweet taste', BioFactors, 9, 73-80).

TABLE 2

Sweetness enhancing salts (Birch, 1999)

| Salt | Dosage required for significant enhancement (mg/l) |
| --- | --- |
| Potassium acetate | 700 |
| Potassium chloride | 450 |
| Sodium chloride | 300 |
| Potassium carbonate | 450 |
| Magnesium acetate | 700 |

To sum up, the sweet perception of sucrose can be enhanced by salts and suppressed by acids, and the sweet perception of fructose can be enhanced by both salts and acids. In fruits and vegetables, the sweet taste is delivered by sucrose, fructose and glucose. And the acidity/sour taste is mainly delivered by organic acids, such as citric acid, lactic acid and tartaric acid. Salts can be utilized in salt solutions.

The food processor and method of processing food as described here makes use of this information as described above, in order to provide juices, smoothies and fruit/vegetable mixtures that have the required taste requirements, without having unnecessarily high sugar levels FIG. 3 shows a detailed workflow for the processing of food.

At step 0, food ingredients here called a first food product are selected to be added to a food chamber of a food processor for processing.

At step 1, a processing unit operating as a "key sweet taste contributor-decision module" identifies which component (sucrose or fructose) provides for the dominant sweet taste. This can be undertaken in various ways, as described above with respect to FIGS. 1-2.

At step 2, following step 1, the processing operating as a "recipe management module" or food pairing module, starts to determine a processing protocol for processing of the start ingredients at step 0.

If sucrose is determined to dominate—A, the followed rules are will be applied with respect to processing of the food product and what additional foods—A1 could be added if necessary:

Foods contains acids (especially citric acid) should be avoided.

Foods contains lower sugar content could be promoted.

Salts can be promoted.

In this condition, the number of pairing food ingredients is ≥0.

If fructose is determined to dominate—B, the followed rules will be applied with respect to processing the food product and what additional foods—B1 should be added:

Foods contains acids (citric acid, ascorbic acid, etc.) that can lower liquid pH should be included.

In this condition, the number of pairing food ingredients ≥1.

At step 3, the processing unit operating as a "sweetness perception enhancement module" continues from step 2, or continues from step 1, to determine the processing protocol for processing of the start ingredients.

The foods are initially blended/juiced—C. Either the weights of the start product at step 0 and those identified at A1 or B1 if additional foods are to be added are input by a consumer to the food processor or a weighing scale internal to the food processor determines these weights—D-The sugar concentration in the combined smoothie/juice, the start ingredients at step 0 and those ingredients identified at step 2 to be added (if necessary) are calculated according to a food composition database and the weights of each food ingredient. Similarly, the acid concentrations can be calculated The smoothie/juice is diluted with certain amount of water or salt water, to reach a required sweet taste perception, that at the same time contains a relatively low or lower sugar concentration. And/or the sweetness perception to the consumer can be enhanced by temperature control of served smoothie/juice, and this is done through appropriate heating or cooling—E.

The smoothie, juice or mixture is provided to the consumer at F. Thus, steps 2 and 3 can be used together or separately.

There follows several detailed examples relating to whether the predominant sugar in the start ingredients is sucrose or fructose:

Example 1: Sucrose Dominates—Steps 0, 1, 2A, 2A1, 3C, 3D, 3E, and F can Apply In this example, carrot is selected as the food ingredient at step 0.

In step 1, sucrose is identified as the dominant sugar.

In step 2, a rule is applied to select pairing food ingredients under step A1 (if required). Thus according to the rule described above with respect to what could be added or not, fruits and vegetables that contain organic acids should be avoided. The rest of food ingredients to be added can be selected according to personal preference outside of the rule above and the consumer can be given a list of potential fruits/vegetables to add. In this case the number of additional food ingredients can be ≥0.

In step 3, sweetness perception can be further enhanced by temperature control (in this case increase smoothies/juice temperature ≥5° C.), and/or dilution with water or salt water—E.

For example, for a starting ingredient of carrot, the sugar concentration in the smoothie/juice with the pairing ingredients can be determined to be $x_1$. It is determined to add an amount of water to the product to bring the sugar concentration down to $x_2$. At the same time, for example it is determined to add salt such that the concentration is 30 mg per 100 g of smoothie/juice.

Example 2: Fructose Dominates—Steps 0, 1, 2B, 2B1, 3C, 3D, 3E, and F can Apply

In this example, apple is selected as the food ingredient at step 0.

In step 1, fructose is identified as the dominant sugar.

In step 2, a rule is applied to select pairing food ingredient. Thus according to the rule described above, foods that contains acids (citric acid, ascorbic acid, etc.) that can lower liquid pH should be included.

In step 3, sweetness perception can be further enhanced by temperature control (in this case decrease of the smoothies/juice temperature by ≥5° C.), and/or dilution with water or salt water.

For example, for a starting ingredient of apple, the sugar concentration and acid concentrations in the smoothie/juice with the pairing ingredients can be determined to be $x_1$ and $y_1$ respectively. It is determined to add an amount of water to the product to bring the sugar concentration down to $x_2$ and the acid concentration down to $y_2$. At the same time, for example it is determined to add salt such that the concentration is 30 mg per 100 g of smoothie/juice.

In another example, for a starting ingredient of apple, the sugar concentration and acid concentrations in the smoothie/juice with the pairing ingredients can be determined to be $x_3$ and $y_3$ respectively. It is determined to add an amount of water to the product to bring the sugar concentration down to $x_4$ and the acid concentration down to $y_4$. At the same time, for example it is determined to add salt such that the concentration is 30 mg per 100 g of smoothie/juice.

FIG. 4 shows a detailed example of a food processor or blender. It contains:

1. Liquid Management Unit (LMU) under the control of a processing unit 50.

The processing required for the food processor can be carried out via a local processing unit or control unit 50, or can be carried out remotely through processing 50 via a mobile phone for example, where the mobile phone can communicate with the food processor via a communication unit 60. The LMU has:

A water tank 70

A salt box 80 with salt auto-dispensing valve 82

A flow through heater 74 that can heat the water or salty water to the required temperature, as monitored by a temperature sensor 76.

The LMU under the control of the processing unit, or on the basis of information provided remotely by the mobile phone implements a water (or salty water) dispensing method as part of a processing protocol as discussed above, to control the dispensing of a required amount of liquid to the Food Chamber 20

2. Food Processing Unit which has:

A Food Chamber 20

Food processing means in the form of a blending blade 30 with associated sensors 3. A Dominant Sugar type identification unit, also termed an ingredient identification module 40.

As discussed above, this can comprise what could be termed a Food type sensing module along with a dominant sugar searching or determination module. This can be for example a camera that detects an image of food or pulp, or information can be from a user of information about the food type using a input unit of the ingredient identification module 40, such as a keypad or providing bar code information. A food type identification app stored in the mobile phone, or stored locally on the food processor can be used by the processing unit to check a sugar content table (either stored locally or in the Cloud). It could also be installed with the device.

Sweetness-change sensing module and its dominant sugar type identification unit. A sweetness sensor is mounted in the Food Chamber. A small amount of the food is blended and a small amount of heated water will be added to the blended food. The sweetness before and after the heated water feeding will be measured and its change will be used to identify the dominant sugar type.

4. The processing unit 50 also runs:

A recipe management module (running locally in the blender or in an app of a mobile device and that communicates with the blender (food processor) by a communication unit 60). As discussed above, based on the result of the dominant sugar type of this food and/or more food, it will generate the recipe including:

Other recommended ingredients/food that are good for sweetness perception enhancement, whether organic, acid-rich food or not The feeding water temperature or heating method, e.g. heat to 30C, or without heating for the purpose of the sweetness perception, and the dilution requirements, etc.

The salt amount to be added to the water

Optionally, the recipes could suggest add an ice cube or not, thus cooling means can be provided within the food processor.

In another exemplary embodiment, a computer program or computer program element is provided that is characterized by being configured to execute the method steps of the method according to one of the preceding embodiments, on an appropriate food processor.

The computer program element might therefore be stored on a computer unit, which might also be part of an embodiment. This computing unit may be configured to perform or induce performing of the steps of the method described above. Moreover, it may be configured to operate the components of the above described food processor. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A food processor, comprising:
   a food chamber;
   food processing means;
   an ingredient identification module; and
   a processing unit;
   wherein, the food chamber is configured to hold foods;
   wherein, the food processing means is configured to process the foods held in the food chamber;
   wherein, the ingredient identification module is configured to determine if either sucrose or fructose is the dominant sugar in a first food product to be processed in the food chamber; and
   wherein, the processing unit is configured to determine a processing protocol for processing at least the first food product, wherein determination of the processing protocol comprises utilization of the determined dominant sugar in the first food product.

2. The food processor according to claim 1, wherein determination of the processing protocol comprises the determination of a second food product to be added to the first food product in the food chamber, and wherein processing of at least the first food product comprises processing the first food product and the second food product.

3. The food processor according to claim 1, wherein determination of the processing protocol comprises the determination of an amount of fluid to be added to the first food product in the food chamber, and wherein processing of at least the first food product comprises processing the first food product and the determined amount of fluid.

4. The food processor according to claim 1, wherein determination of the processing protocol comprises the determination of an amount of salt to be added to the first food product in the food chamber, and wherein processing of at least the first food product comprises processing the first food product and the determined amount of salt.

5. The food processor according to claim 1, wherein the food chamber comprises heating means and/or cooling means, and wherein determination of the processing protocol comprises the determination of a temperature for processing the first food product, and wherein processing of at least the first food product comprises processing the first food product at the determined temperature.

6. The food processor according to claim 1, wherein the ingredient identification module comprises at least one sensor configured to provide sensing data for the first food product, and wherein determination of the dominant sugar in the first food product comprises utilization of at least some of the sensing data.

7. The food processor according to claim 6, wherein the at least one sensor comprises a colour sensor configured to determine at least one colour of the first food product, and wherein the sensing data comprises the at least one colour of the first food product.

8. The food processor according to claim 6, wherein the at least one sensor comprises a sweetness sensor configured to determine a sweetness level of the first food product, and wherein the sensing data comprises the sweetness level.

9. The food processor according to claim 8, wherein the sweetness sensor comprises blending and/or grounding means and comprises heating and/or cooling means, and wherein determination of the sweetness level comprises the blending and/or grinding of an amount of the first food product followed by heating and/or cooling.

10. The food processor according to claim 1, wherein the ingredient identification module comprises at least one input unit configured to provide product data for the first food product, and wherein determination of the dominant sugar in the first food product comprises utilization of at least some of the product data.

11. The food processor according to claim 10, wherein the at least one input unit is configured to enable a user to input data relating to the first food product.

12. The food processor according to claim 10, wherein the at least one input unit comprises means to input bar-code information relating to the first food product.

13. The food processor according to claim 1, wherein the food chamber comprises weighing means configured to determine a weight of foods in the food chamber, and wherein determination of the processing protocol comprises utilization of the determined weight of the first food product.

14. A method for processing food, comprising:
   a) holding a first food product in a food chamber, wherein food processing means are configured to process at least the first food product in the food chamber;
   b) determining by an ingredient identification module if either sucrose or fructose is the dominant sugar in the first food product to be processed;
   c) determining by a processing unit a processing protocol for processing the first food product, wherein determination of the processing protocol comprises utilization of the determined dominant sugar in the first food product; and
   d) processing by the food processing means at least the first food product in the food chamber.

15. A non-transitory computer program element for controlling a food processor, which when executed by a processor is configured to carryout the method of claim 14.

* * * * *